Sept. 13, 1960 — J. TRAKSEL — 2,952,154
AIR SPEED MEASURING DEVICE FOR AIRCRAFT
Filed April 26, 1955 — 3 Sheets-Sheet 1
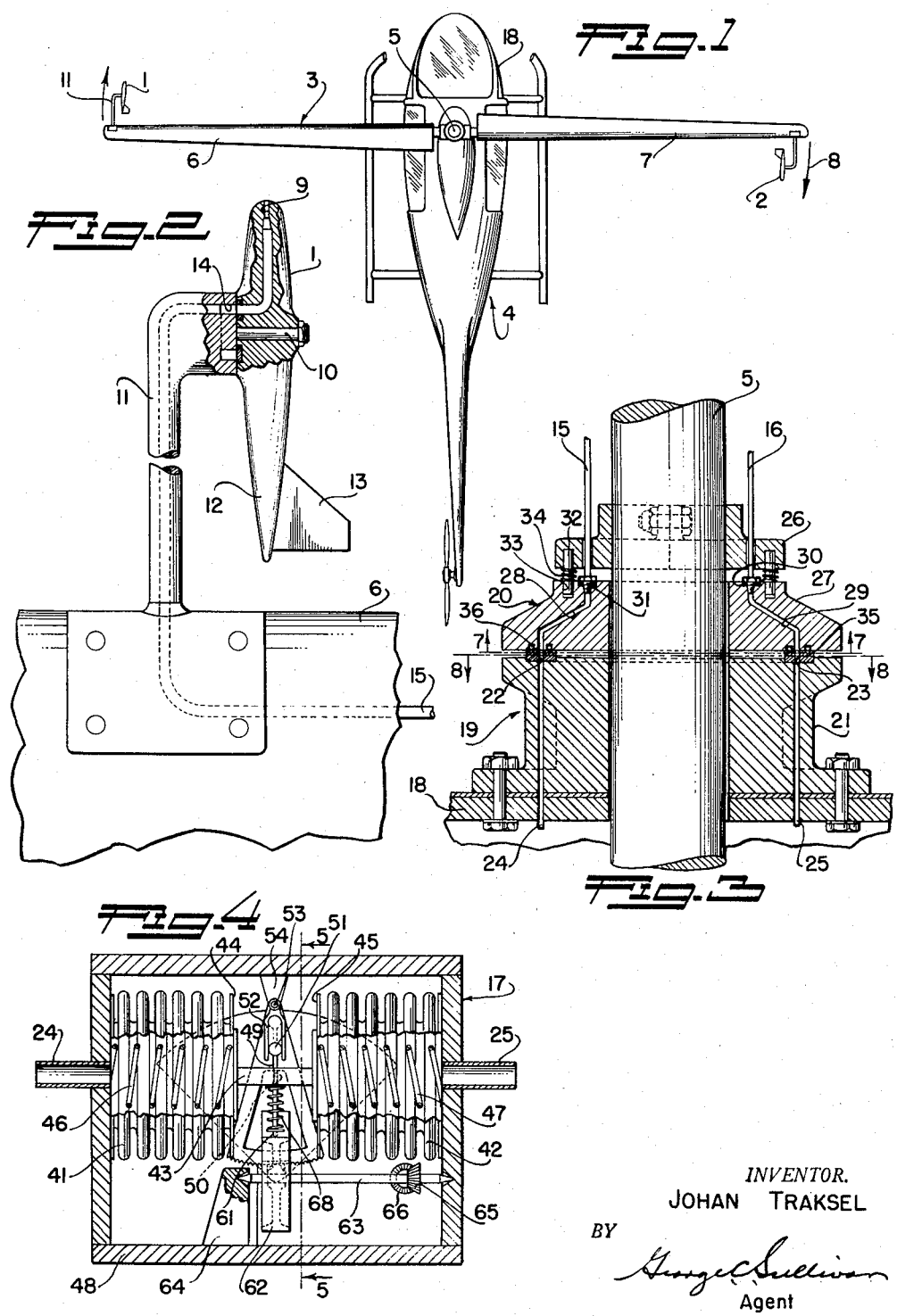
INVENTOR.
JOHAN TRAKSEL
BY
*George C. Sullivan*
Agent Sept. 13, 1960 J. TRAKSEL 2,952,154
AIR SPEED MEASURING DEVICE FOR AIRCRAFT
Filed April 26, 1955 3 Sheets-Sheet 2

INVENTOR.
JOHAN TRAKSEL
BY
George C. Sullivan
Agent

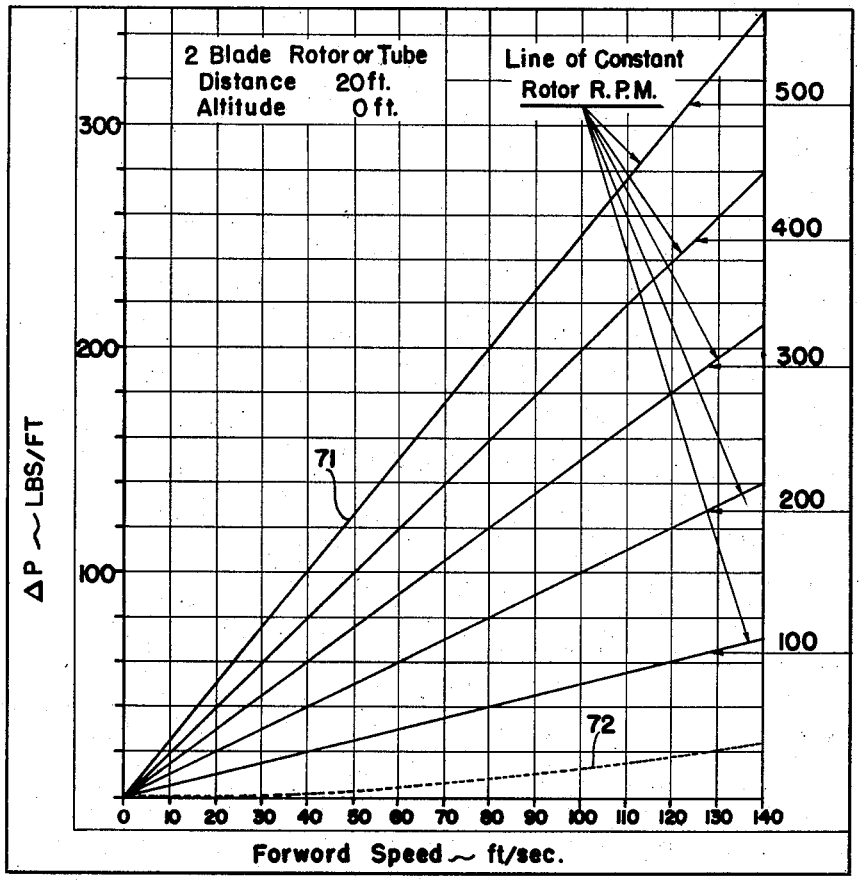
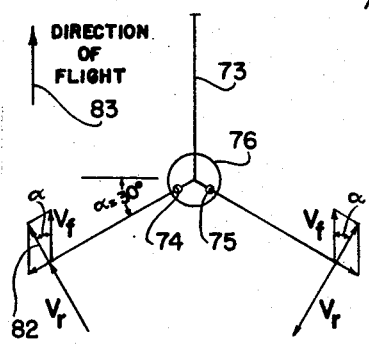
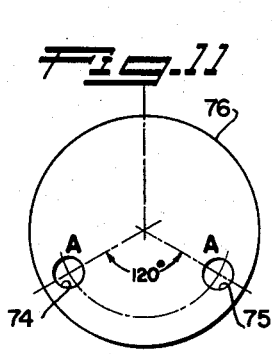
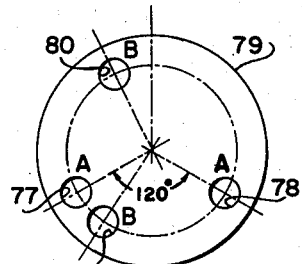

United States Patent Office 2,952,154
Patented Sept. 13, 1960

2,952,154

AIR SPEED MEASURING DEVICE FOR AIRCRAFT

Johan Traksel, Van Nuys, Calif., assignor to Lockheed Aircraft Corporation, Burbank, Calif.

Filed Apr. 26, 1955, Ser. No. 503,960

3 Claims. (Cl. 73—182)

This invention relates to a velocity measuring device for aircraft of the type sustained by a rotating propeller wherein the difference between two dynamic or ram air pressures are detected to provide an air speed indication which is accurate even at very low linear velocities.

Air speed measurements are conventionally obtained by the use of a pitot tube which measures the dynamic pressure and a static tube which measures the static air pressure. By comparing the dynamic pressure and the static pressure, a velocity indication may be readily obtained so long as the pressure differential is large enough to render the energy losses, such as friction in the indicating instrument, insignificant. At velocities below approximately 20 miles per hour this condition does not exist and air speed indications using conventional equipment are therefore highly unreliable and inaccurate for making low speed measurements.

In aircraft of the type which will take off and land vertically such as a helicopter it is often most important to provide an accurate indication of air speed at horizontal velocities as low as 1 to 3 feet per second and as stated above the conventional air speed measuring equipment is unsatisfactory for this purpose. Accordingly, it is an object of this invention to provide an air speed indicator which will provide differential working pressures for measuring air speed accurately even at low linear velocities.

In addition to the fact that conventional air speed indicators which measure the pressure difference between the dynamic and static pressures are incapable of accurately indicating air speed below approximately 20 miles per hour, they are also difficult to use on aircraft of the helicopter type since it is practically impossible to accurately obtain the free stream dynamic pressure due to the downwash of the rotor over the fuselage. It is therefore another object of this invention to provide an air speed indicator which will effectively overcome this deficiency present in conventional air speed indicators. This is accomplished by detecting two ram air pressures under substantially the same environmental conditions wherein ram air pressure errors due to rotor downwash are substantially cancelled.

Another object of this invention is to provide an air speed indicating system which is readily adaptable for use as a modification on existing aircraft of the helicopter type.

Another object of this invention is to provide a simple and dependable differential pressure gauge and rotary valve arrangement for an air speed indicating system which will provide an accurate velocity indication by comparing two dynamic pressures.

Still another object of this invention is to provide an air speed indicating system which is capable of measuring air speed in any desired direction normal to the axis of propeller rotation.

Further and other objects will become apparent from a reading of the following description especially when considered in combination with the accompanying drawing wherein like numerals refer to like parts.

In the drawing:

Figure 1 is a view showing the pitot tube arrangement for the air speed measuring device of this invention on the propeller blades of a helicopter;

Figure 2 is an enlarged fragmentary view showing the pitot tube mounting structure;

Figure 3 is a sectional view of a disc type rotary valve mechanism forming part of the invention;

Figure 4 is a fragmentary sectional view of the differential pressure measuring gauge;

Figure 9 is a plot showing the variations in differential pressure for selected rotor speeds;

Figure 10 shows diagrammatically the use of the air speed indicator with a three-bladed rotor; and Figures 11 and 12 show diagrammatically the relationship between the ports for a three-bladed rotor in a disc type rotary valve like that shown in Figure 3.

Figure 5:
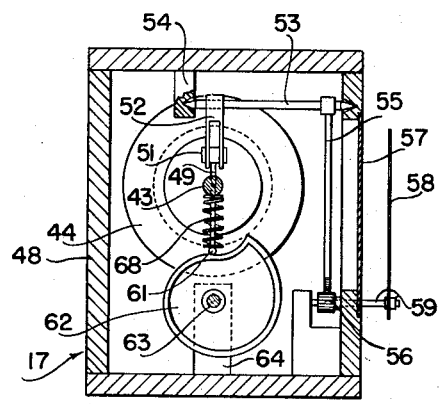
Figure 5 is a sectional view taken on line 5—5 of Figure 4.

Referring to Figures 1 and 2, a pair of pitot tubes 1 and 2 are secured to the outer ends of a two-bladed rotor or propeller 3 of a helicopter 4. Pitot tubes 1 and 2 are spaced substantially equidistant from the axis of rotation of propeller 3 which axis is defined as the centerline of rotor shaft 5. By rotating propeller 3 with the use of a suitable power source (not shown) sufficient lift is developed to cause the helicopter to rise vertically. The amount of lift developed will depend upon the rotational speed of propeller 3 and upon the angle of attack of the blades 6 and 7 relative to the free stream air.

Assuming propeller 3 rotates in a clockwise direction as viewed in Figure 1 and as indicated by arrows 8, pitot tubes 1 and 2 should project forwardly as shown and ahead of the blade to which it is attached so that the opening 9 in the pitot tube will receive ram air. Pitot tubes 1 and 2 are each rotatably carried on an axle 10 secured to a mounting bracket or post 11 which is fastened by suitable means to the leading edge of the propeller blades 6 and 7 as best shown in Figure 2. A tail member 12 on each pitot tube is provided with an aerodynamic stabilizing vane 13 which maintains the pitot tube aimed directly into the air stream regardless of the pitch setting of the propeller blade to which it is attached.

Opening 9 in each pitot tube communicates with an annular chamber 14 formed in post 11 whereby the ram air pressure may be fed through a tube 15 or 16, one for each pitot tube, to a differential pressure gauge or pressure comparator device 17 inside the fuselage 18 of the vehicle.

Since it is the difference between the dynamic pressures detected by the two pitot tubes which is used to provide an indication of velocity, the effects of air turbulence in the path of the propeller blades will tend to cancel out, thus eliminating a major source for error present in conventional air speed measuring devices which utilize the pressure difference between the dynamic and static pressures.

Figure 7:
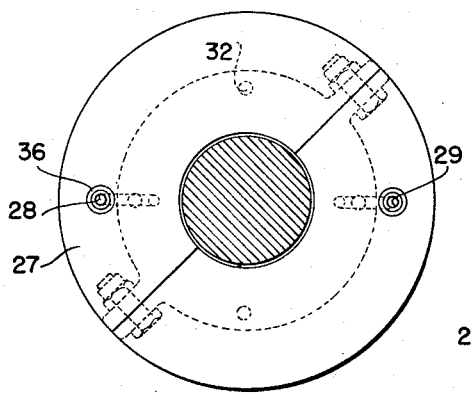
Figure 7 is a sectional view taken on line 7—7 of Figure 3.
Figure 8:
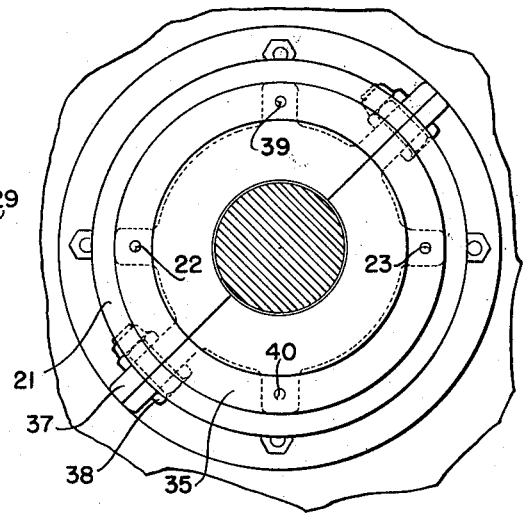
Figure 8 is a sectional view taken on line 8—8 of Figure 3.

Due to the rotation of propeller 3 relative to fuselage 18 it is necessary to employ a disc type rotary valve 19 as shown in Figures 3, 7 and 8 in order to provide fluid communication between each pitot tube and the pressure comparator device 17. Valve 19 includes a rotatable disc-like assembly 20 which is fixedly secured to propeller shaft 5 and a fixed base member 21 which is secured to fuselage 18. Base member 21 is provided with a pair of ports 22 and 23 located 180° apart relative to shaft 5 as best shown in Figure 8 for each coordinate velocity to be measured as hereinafter more fully described in detail. Each port such as 22 and 23 in base member 21 communicates with a pressure transmitting tube such as is shown in Figure 3 at 24 and 25. Tubes 24 and 25 direct the ram air pressure from pitot tubes 1 and 2 to the dynamic pressure comparing instrument 17 illustrated in Figure 4.

Rotatable disc-like assembly 20 includes a clamping sleeve 26 which tightly engages propeller shaft 5 and receives pressure tubes 15 and 16, the opposite ends of which communicate with pitot tubes 1 and 2 respectively. A floating member 27 concentrically arranged relative to shaft 5 and located between sleeve 26 and base member 21 of the valve is provided with ports 28 and 29 which are adapted to slidably receive the free ends 30 of tubes 15 and 16 for directing the ram air into tubes 24 and 25 projecting from the lower base member while allowing floating member 27 to move axially of shaft 5 and thereby squeeze against the face of base member 21 to prevent air leakage. Suitable sealing means 31 is provided at the inlet to ports 28 and 29 for closely engaging tubing 15 and 16 to prevent air leakage between floating member 27 and the tubes which are slidably received therein.

Relative rotation between clamping sleeve 26 and floating member 27 is eliminated by the use of guide pins 32 carried by sleeve 26 which project into mating holes 33 formed in the floating member. Springs 34 located between sleeve 26 and floating member 27 and concentrically arranged relative to pins 32 force the floating member against the face of fixed base member 21.

To positively prevent air leakage between floating member 27 and base member 21, an annular seating ring 35 is secured to the base member as shown in Figures 3 and 8 wherein the seating ring has openings formed therein in alignment with ports such as 24 and 25. Additional sealing to prevent air leakage between floating member 27 and base member 21 may be obtained by the use of O ring seals 36, or the like, around ports 28 and 29 in floating member 27 as best shown in Figures 3 and 7.

To facilitate installation and removal of disc type rotary valve 19, base member 21, clamping sleeve 26 and floating member 27 are segmented as shown in Figures 7 and 8 and are provided with clamping flanges such as flange 37 which are drilled to receive bolts such as bolt 38 for holding the segments together.

As is apparent from the construction of valve assembly 19 the pressure applied to the differential pressure gauge 17 from Pitot tubes 1 and 2 will be pulsating rather than continuous. This is necessary in order to obtain the velocity of the vehicle in a given direction normal to the axis of rotation of the propeller shaft.

Since the ram air pressures are compared to obtain velocity readings in a given direction this pressure comparison must be made when the propeller blades reach a certain rotational position relative to the fuselage. For example, to measure the forward velocity of the vehicle (the velocity in the direction of the fuselage longitudinal axis) the pressures must be detected when the propeller blades are in the position shown in Figure 1 substantially normal to the longitudinal axis of the fuselage. This timing is accomplished by simply locating a pair of ports 22 and 23 in base member 21 of valve 19 so that they will communicate with ports 28 and 29 in floating member 27 at each finite instant when the propeller blades pass the transverse rotational position relative to the fuselage.

To measure the drift velocity or velocity in the direction normal to the rotational axis of propeller and normal to the longitudinal axis of the fuselage it is merely necessary to arrange a second pair of ports 39 and 40 in base member 21 of valve assembly 19 as shown in Figure 8 wherein the second pair of ports are displaced 90° from the forward velocity measuring ports 22 and 23. Of course, to measure the drift velocity it is necessary to provide a second pair of tubes like 24 and 25 and a second differential pressure gauge 17.

To increase the time duration of the dynamic pressure pulses which are applied to comparator instrument 17 the ports such as 22 and 23 in base member 21 may be elongated but such elongation must not be so great as to allow the instrument to detect ram air pressure when the propeller rotational position is more than 5 to 10 degrees off the theoretically correct rotational position relative to the fuselage for the velocity measurement desired. Otherwise, errors will appear in the velocity readings. Normally this elongation of ports such as 22 and 23 in the base member of valve assembly 19 is not necessary since the pressure pulses will exist for a sufficient finite length of time and with sufficient rapidity to effectively actuate the differential pressure gauge which provides the velocity reading.

The dynamic pressure pulses applied to differential gauge 17 through rotary valve 19 from Pitot tube 1 are fed into a bellows type diaphragm 41 located at one end of the gauge and the dynamic pressure pulses from Pitot tube 2 are applied to a second bellows type diaphragm 42 located in an opposed coaxially aligned position relative to diaphragm 41. A piston-like spacer 43 is inserted between the two diaphragms 41 and 42 and secured to the adjacent diaphragm faces 44 and 45. Springs 46 and 47 concentrically arranged within diaphragms 41 and 42 urge the latter into a neutral, zero pressure differential position. When the pressure inside one of the diaphragms becomes larger than the pressure inside the other diaphragm, spacer 43 is caused to move axially relative to differential gauge housing 48. This axial movement of spacer 43 is proportional to the magnitude of the differential pressure applied through tubes such as 24 and 25.

As shown in Figures 4 and 5 a pin 49 is slidably received by a transverse bore 50 in spacer 43. A cam-like end 51 on pin 49 slidably engages a fork or yoke 52 fixedly secured to a shaft 53. Shaft 53 is rotatably supported at one end by a bracket 54 secured to differential gauge housing 48 and at its opposite end by the housing itself. A sector gear 55 fixedly secured to shaft 53 is caused to rotate with the shaft when spacer 43 is rotated by a differential pressure applied to diaphragms 41 and 42. A pinion gear 56 carried by housing 17 adjacent face 57 of the differential gauge is arranged to engage sector gear 55 and effect rotational movement of an indicator arm 58 about shaft 59 secured to pinion 56.

Figure 6:
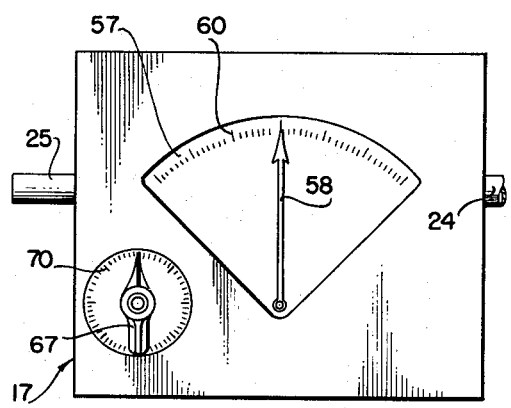
Figure 6 is a front view showing the control panel on the differential pressure gauge.

As shown in Figure 6 face 57 of differential gauge 17 is provided with indicia 60 calibrated to provide direct velocity readings in cooperation with indicator arm 58.

A roller 61 carried on pin 49 at the end opposite end 51 is arranged to engage a cam member 62 on shaft 63. Shaft 63 is supported by a bracket 64 on housing 48 and by the housing itself as best shown in Figure 4. Shaft 63 carries a bevel gear 65 which engages a second bevel gear 66 connecting with a manually controlled knob 67 located on the face 57 of differential gauge 17. By turning knob 67 cam 62 may be rotated to determine the axial position of pin 49 relative to spacer 43. Thus, the mechanical advantage of the mechanism for effecting rotation of indicator arm 58 may be varied as desired for calibration of the instrument. As cam-like end 51 of pin 49 moves farther away from the fulcrum of yoke 52, the angular movement of indicator arm 58 is decreased for a given lateral displacement of spacer 43.

To insure positive engagement of roller 61 with cam member 62 at all times, a spring 68 concentrically arranged relative to pin 49 urges the pin toward the cam.

The proper rotational position of cam 63 in differential pressure gauge 17, in order to provide an accurate indication of velocity, depends upon the rotational velocity of propeller 3 on which the pitot tubes 1 and 2 are carried. This will become apparent by considering the velocity measuring problem analytically. Using Bernoulli's equation for the basic relationship between air pressure and velocity we may write the following expression for the advancing pitot tube, which in Figure 1 is tube 1 when measuring the forward velocity:

$$P_1 = P_s + \tfrac{1}{2}\rho(V_r + V_f)^2 \qquad (1)$$

Where $P_1$ represents the total pressure or ram air pressure in pounds per square foot; $P_s$ represents the static air pressure; $\rho$ represents the air density in slugs per cubic foot; $V_r$ represents the tangential velocity in feet per second at the point on the rotor or propeller where the pitot tube is located and; $V_f$ represents the forward velocity of the vehicle in feet per second.

The total or ram air pressure detected by the retreating pitot tube which corresponds to tube 2 in Figure 1 when measuring the forward velocity may be expressed as follows:

$$P_2 = P_s + \tfrac{1}{2}\rho(V_r - V_f)^2 \qquad (2)$$

Where $P_2$ represents the dynamic or ram air pressure detected by the retreating pitot tube in pounds per square foot and; the other terms represent the same quantities as are defined under Equation 1 above.

Hence, the equation for the differential pressure acting on bellows type diaphragms 41 and 42 in differential gauge 17 may be expressed in equation form as follows:

$$P_1 - P_2 = \tfrac{1}{2}\rho[(V_r + V_f)^2 - (V_r - V_f)^2] \qquad (3)$$

By expandng Equation 3 and simplifying, the following equation expressing the relationship between the differential ram air pressure and velocity may be written:

$$\Delta P = P_1 - P_2 = 2\rho V_r V_f \qquad (4)$$

It is seen from Equation 4 that the differential pressure applied to gauge 17 is a function of both tangential speed of the rotor and the forward velocity of the vehicle as well as the air density. In most all instances however, where the flight altitude limits are reasonable, the air density, $\rho$, may be considered constant. Therefore, to provide an accurate indication of air speed in a direction normal to the rotational axis of the propeller such as in a forward direction as described herein by way of example, means must be provided to adjust the instrument only for a given rotational velocity of the propeller or rotor. This is the function of cam 62 and by simply providing a graduated dial 70 on face 57 of differential gauge 17 which is calibrated to read in terms of the propeller rotational velocity, knob 67 may be turned to correspond to that particular velocity of rotation and thus adjust the instrument for correctly indicating air speed in the particular direction.

The variation in pressure differential with air speed is illustrated in Figure 9 for a series of propeller rotational velocities. It is seen from this plot that the pressure differential between the dynamic pressures employed by this invention vary substantially linearly as indicated by solid lines 71. To provide a comparison between the magnitudes of the differential pressures obtained with the use of a pitot tube arrangement as taught by this invention and by the conventional pitot-static tube arrangement, the differential pressure curve obtained with a conventional pitot tube arrangement is shown in Figure 9 as dotted line 72. It is apparent from this plot that the magnitude of the differential pressures available for actuating the velocity indicator are much higher when using the plural pitot tube arrangement of this invention. This is particularly important at speeds below 40 to 50 feet per second. This high working pressure permits the design of a more rugged instrument and one which is quite accurate at very low vehicle velocities.

The operation of the air speed measuring device is believed obvious from a reading of the foregoing description particularly as it is applied to a propeller having blades arranged 180° apart such as on a two or four-bladed propeller. The dynamic pressure picked up by the two pitot tubes mounted on the opposite ends of the propeller are applied to a differential pressure gauge 17 through a rotary valve 19 which allow the pressure to be applied to the instrument in the form of pulses having a finite duration depending upon the size and shape of the ports in the rotary valve and a repetition rate equal to twice the rotor speed. Thus, under normal rotational velocities a large number of pulses per minute will be applied to the bellows diaphragms 41 and 42 in the differential gauge 17 to eliminate flutter of indicating arm 58. The stability of indicator arm 58 is also aided by the fact that during the interval between pressure pulses rotary valve 19 seals off the ports and prevents the loss of air pressurizing the diaphragms.

Immediately prior to making a velocity reading, knob 67 on the face of differential gauge 17 is adjusted to represent the propeller rotational velocity.

The air speed measuring device may also be used on propellers or rotors even though their blades are not arranged 180° apart such as on a three-bladed rotor as schematically illustrated in Figure 10 wherein blades 73 are generally 120° apart. With such a blade arrangement the pitot tubes may be mounted on two or more of the blades in the same manner as is illustrated in Figures 1 and 2. The only requirement is that the pitot tubes be located one on either side of a plane defined by the propeller axis and the direction in which the velocity is to be measured while the velocity determining difference pressures are being detected. The same type of rotary valve as is shown in Figure 3 and the same type of differential gauge as is shown in Figures 4 and 5 may be employed. The only structural differences which will be required when using the device in connection with a three-bladed propeller is illustrated in Figures 11 and 12 wherein the location of ports 74 and 75 in floating member 76, which corresponds with floating member 27 in Figure 3, are located 120° apart rather than 180°. Also, ports 77 and 78 in base member 79, which corresponds with the base member 21 in rotary valve 19 of Figure 3 for measuring the forward velocity, must likewise be located 120° apart, as indicated, to correspond with the relationship between the propellers.

It is believed apparent that the velocity in any direction in the plane generally normal to the axis of propeller rotation may be obtained with the air speed measuring device described herein by simply selecting the location of the ports in the base member of the rotary valve 19 to provide pressure pulses when the propeller is in the proper rotational position relative to the fuselage of the vehicle. If drift velocity information is desired using the three-bladed propeller configuration of Figure 10, ports 80 and 81 may be provided in base member 79 to supply pressure pulses to a differential pressure gauge like that shown in Figure 4 when the propeller has rotated 90° from the forward velocity measuring position.

While the principles of operation of the air speed measuring device on a three-bladed rotor are no different than on the two-bladed rotor shown in Figure 1, a slight reduction in the ram air pressure detected by the pitot tubes will occur for a given forward velocity due to the angular relationship of the pitot tube with respect to the relative wind. This reduction is illustrated graphically in Figure 10 wherein the ram air pressure due to the rotational velocity of the propeller as represented by the vector $V_r$ is added with a vector 82 derived from the vehicle velocity in the direction indicated by the arrow 83. Velocity vector 82 is displaced an amount $\alpha$, or 30° where the blades are 120° apart, from the true velocity vector $V_f$. Thus, the ram air pressure due to the vehicle velocity in the direction of flight will be equal to $V_t$ times the cosine of $\alpha$, or 30° in the case shown. The angle $\alpha$ which the pitot tube makes with respect to the direction of flight in which the velocity measurement is to be made may of course be different, depending upon the propeller blade arrangement. The effect of using only the velocity component, $V_t$, is to decrease the value of the constant in Equation 4 hereinabove derived. Thus, the only change which would be required for the differential pressure gauge used with the Figure 1 propeller configuration would be to recalibrate the instrument and this may conveniently be done with cam 62 through rotation of knob 67 on face 57 of the instrument.

While the positioning of cam 62 is described herein as being performed manually it should be understood as being illustrative only and that any suitable means for performing the same function either manually or automatically may be employed without departing from the teachings of the invention. Also diaphragms 41 and 42 in the differential pressure gauge need not necessarily be of the bellows type as shown. Any type of differential pressure measuring gauge may be employed in carrying out the teachings of the invention so long as calibrating means are provided to correct for different propeller rotational velocities.

It is to be understood that certain alterations and modifications and substitutions in addition to those suggested above may be made to the instant disclosure without departing from the spirit and scope of the invention as defined by the appended claims.

I claim:

1. A device for measuring the velocity of a rotating propeller in a direction generally normal to the axis of propeller rotation comprising, a pair of pitot tubes carried on the propeller and spaced one on either side of a plane defined by the propeller axis and the direction in which the velocity is to be measured at least once during each propeller revolution, said pitot tubes being aimed in the direction of propeller rotation for receiving ram air, a pair of opposed flexible diaphragms each arranged to receive ram air detected by one of said pitot tubes, means connecting said diaphragms together to provide mechanical movement representing the differential between the ram air pressures detected, velocity indicating means driven by the last mentioned means to provide a velocity indication, cam means connected to said velocity indicating means and providing mechanical motion amplification for calibrating the indicating means in accordance with the rotational velocity of the propeller, and valve means interposed between said diaphragms and said pitot tubes and effecting fluid communication therebetween only at predetermined propeller rotational positions whereby the velocity may be measured in only one direction, said valve means providing a pressure tight seal for said diaphragms which substantially prevents fluid leakage therefrom when the propeller rotational position is other than at said predetermined positions.

2. A device for measuring the velocity of a rotating propeller in a direction generally normal to the axis of propeller rotation comprising, a pair of pitot tubes carried on the propeller and spaced one on either side of a plane defined by the propeller axis and the direction in which the velocity is to be measured at least once during each propeller revolution, said pitot tubes being aimed in the direction of propeller rotation for receiving ram air, a pair of opposed flexible diaphragms each arranged to receive ram air detected by one of said pitot tubes, means connecting said diaphragms together to provide mechanical movement representing the differential between the ram air pressures detected, velocity indicating means driven by the last mentioned means to provide a velocity indication, cam means connected to said velocity indicating means and providing mechanical motion amplification for calibrating the indicating means in accordance with the rotational velocity of the propeller, and valve means interposed between said diaphragms and said pitot tubes and effecting fluid communication therebetween only at predetermined propeller rotational positions whereby the velocity may be measured in a single desired direction.

3. A device for measuring the velocity of a rotating propeller in a direction generally normal to the axis of propeller rotation comprising, a pair of pitot tubes carried on the propeller and spaced one on either side of a plane defined by the propeller axis and the direction in which the velocity is to be measured at least once during each propeller revolution, said pitot tubes being aimed in the direction of propeller rotation for receiving ram air, a pair of pressure transducers each arranged to receive ram air detected by one of said pitot tubes, said transducers being connected together to provide a differential output representing the difference between the pressures detected by the pair of pitot tubes, velocity indicating means operatively connected to said transducers, calibrating means connected to said velocity indicating means for adjusting the latter for specific propeller rotational velocities, and valve means interposed between said transducers and said pitot tubes and effecting fluid communication therebetween only at pre-determined propeller rotational positions whereby the velocity may be measured in only one direction, said valve means providing a pressure tight seal for said transducers which substantially prevents fluid leakage therefrom when the propeller rotational position is other than at said predetermined positions.

References Cited in the file of this patent

UNITED STATES PATENTS

| | | |
|---|---|---|
| 2,497,255 | Brown | Feb. 14, 1950 |
| 2,524,747 | Ayres | Oct. 10, 1950 |
| 2,531,521 | Link | Nov. 28, 1950 |
| 2,624,531 | Stalker | Jan. 6, 1953 |
| 2,674,121 | Gorman | Apr. 6, 1954 |